Figure 1:
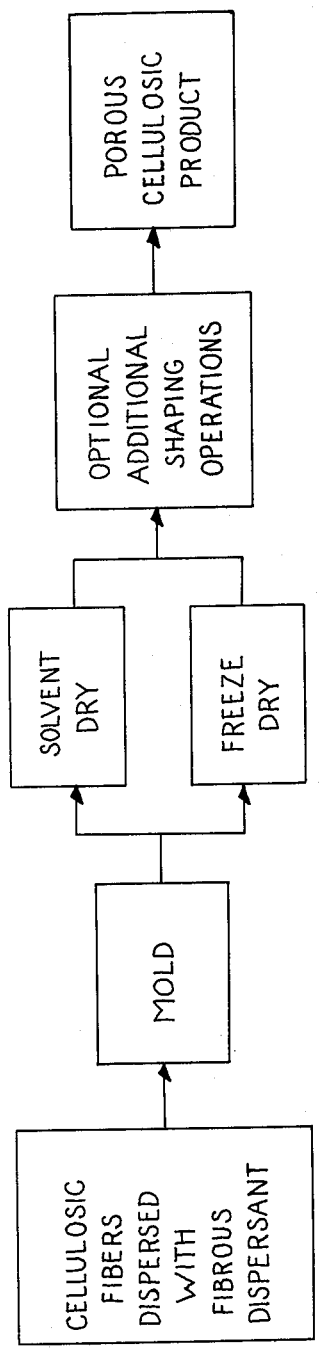

June 14, 1966 J. W. ADAMS ET AL 3,256,372
METHOD FOR PREPARING MODIFIED CELLULOSE FILTER MATERIAL
Filed April 28, 1964

INVENTORS
JAMES W. ADAMS
HENRY W. HOFTIEZER
BY
ATTORNEYS

United States Patent Office 3,256,372
Patented June 14, 1966

3,256,372
METHOD FOR PREPARING MODIFIED CELLULOSE FILTER MATERIAL
James W. Adams and Henry W. Hoffiezer, Schofield, Wis., assignors to American Can Company, New York, N.Y., a corporation of New Jersey
Filed Apr. 28, 1964, Ser. No. 363,242
9 Claims. (Cl. 264—28)

This invention relates to methods for making porous cellulosic products. These novel materials are produced from cellulosic pastes containing significant amounts of additives which produce novel properties in products produced therefrom in accordance with the method of the present invention. In one specific embodiment the invention relates to processes of making cigarette filters. In another embodiment the invention relates to the production of materials having very high capacity to absorb and retain water.

In accordance with the present invention it has been discovered that cellulosic fibers, when modified by the deposition or formation therein of polymers containing hydrophilic functional groups, can be formed into a light cohesive material suitable for filtering gases and absorbing liquids. This material is of particular utility in removing tars and other impurities from cigarette smoke.

Various methods of in situ polymerization of monomers within fibers such as cellulose have been taught in the prior art. Among these are deposition of monomer from the vapor phase; replacement of water, used to swell the fibers, with acetone, followed by treatment with an acetone solution of monomer and catalyst; and the "anchored catalyst technique" first disclosed by Lipson et al., Nature, 157:590 (1946) and Landells et al., J. Soc. Dyers and Colourists 67:338–344 (1951). Any of these methods will produce suitable starting materials for the practice of my invention. It is preferred, due to economic considerations, to use the "anchored catalyst" technique.

It has been discovered that a certain class of in situ deposited polymers cause the resulting modified host cellulosic material to exhibit dispersing or lubricating properties when used alone or when mixed with unmodified cellulosic fibers. Because slurries of cellulosic materials such as cotton, rayon, wood pulp, or bast fibers are ordinarily coarse and clumpy, and lack flow properties, these materials cannot be extruded without expending a large amount of power. The dispersed materials of the present invention are slippery to the touch, and may readily be extruded or otherwise formed into any desired shape. Previously, such dispersed fibers have been used in small amounts as strengthening additives for fabrics or papers. If compositions containing the dispersed fibers were allowed to dry under ordinary conditions, for example, in air, or in a drying oven, the resulting products became more dense and hard as the percentage of dispersing fibers was increased. If thick shaped objects were attempted to be formed, they tended to be board-like and have an irregular surface.

It has now been further discovered that these materials, when dried under certain conditions, will result in an unexpectedly different product. The product of this invention is a light, porous, cohesive, and generally white material possessing remarkable ability to filter impurities from gases and to absorb large amounts of liquids. This material in one embodiment is highly effective in filtering air or other gases, and when used as a cigarette filter, will achieve much greater removal of tars and other particulate matter from the smoke than conventionally used material of the same weight. This is true despite the fact that these new materials are lighter than conventional filter materials, are cohesive and homogenous, and permit smoke or other gases to be drawn therethrough very easily.

Alternative modes of carrying out our method are illustrated in FIGURE 1, which is in the form of a flow diagram.

The starting materials used in the practice of the invention are cellulosic fibers having deposited in situ therein a synthetic polymer of the general formula:

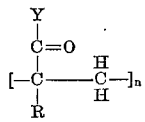

in which:

R is a hydrogen atom or a methyl group,
Y is OH, OM, or $NH_2$,
M is an alkali metal or ammonium ion, and
n is an integer greater than 500

Various reactions producing the desired polymers will be immediately apparent to those skilled in the art. Examples of such methods are listed here, but this list is not intended to be exhaustive:

(1) Polymerize acrylonitrile in the fibers and hydrolyze with an alkaline solution to form alkali salts of polyacrylic acid.
(2) Polymerize methyl acrylate in the fibers and hydrolyze with an alkaline solution to form alkali salts of polyacrylic acid.
(3) Polymerize ethyl acrylate in the fibers and hydrolyze with an alkaline solution to form alkali salts of polyacrylic acid.
(4) Polymerize acrylic acid or alkali salts of acrylic acid in the fibers.
(5) Polymerize methacrylonitrile in the fibers and hydrolyze with acids to form polymethacrylic acid or hydrolyze with an alkaline solution to form alkali salts of polymethacrylic acid.
(6) Polymerize methacrylic acid or alkali salts of methacrylic acid in the fibers.
(7) Polymerize acrylamide in the fibers.
(8) Polymerize methacrylamide in the fibers.
(9) Form copolymers of any of the above monomers or copolymerize with a small amount of non-hydrolyzable monomers.

For purposes of the present specification and claims "alkali salts" are defined to include the alkali group metal salts and ammonium salts.

The fibers produced by these procedures are slippery, gelatinous and highly swollen by the deposition therein of these hydrophilic polymers. These fibers, which are herein designated as "hydrophilic polymer modified cellulosic fibers," are readily dispersed in water and aid in the dispersing of other, untreated cellulosic fibers. It is believed that a substantial portion of the polymer, estimated to range between 50 and 90 percent, is grafted onto the fibers and the remainder is occluded, for example, in the hollow core of the fibers. The mechanism by which the synthetic polmers are retained in the fibers is not critical, so long as they are bound thereto strongly enough that at least a substantial percentage is not leached out during the further processing of the fibers.

The products of the present invention may be formed from a blend of untreated fibers and fibers containing preferably from 20% to 80% by weight of polymer modified fibers. This embodiment is preferred for economic reasons because only a portion of the fibers need be processed in the polymer deposition step. However, if desired, all of the fibers used may contain polymer. In the latter case a lower polymer loading may be used, preferably in the range of from 20% to 40% by weight of polymer. Fibers of this type containing more than 90% polymer have been produced and porous products made therefrom possess properties very similar to those formed from fibers containing lower polymer loadings.

It is of central importance to the present invention that a method has been discovered by which cellulosic slurries can be produced which are at the same time both easily moldable and yet shape stable enough after molding to retain their form as integral wet products. These slurries when extruded have the appearance of wet rope. The materials of the present invention, in other words, have properties of cohesion and fluidity analogous to those of a stiff grease.

These polymer-containing fibers are formed into a slurry of paste-like consistency, which contains from about 75% to 97% water. The amount of water necessary to produce a paste-like consistency depends on the amount of polymer present in the fibers and on the length of the fibers. For example, a larger amount of polymer in the fibers and/or water is necessary to produce an extrudable paste from longer fibers such as those in softwood kraft pulp as compared with shorter fibers such as those in hardwood sulphite pulp, and even more is necessary in the case of still longer fibers such as jute or bast fibers. The optimum percentages of dispersing fibers and water for any particular length fibers which will result in a composition which is moldable yet shape stable after molding can be determined by one with ordinary skill in the art by routine experimentation. In contrast with slurries containing only untreated cellulosic fibers, which are coarse to the touch, and ordinarily regarded as "nonextrudable," since if extrusion through an orifice is attempted, the fibers will be dewatered and the aqueous portion expressed through the orifice, the paste used in the present method are slippery to the touch, and can readily be expressed through an extrusion die to form a coherent rod. It is believed that these pastes are extrudable because the hydrophilic polymers present in the polymer modified fibers impart a dispersing and lubricating character thereto with the unique distinction that the dispersing or lubricating medium is itself of a fibrous nature and therefore will not become segregated from any untreated fibers present during molding or shaping operations.

A suitable paste-like slurry can then be molded by extrusion, injection molding, or other pressure deformation into any desired configuration. In the case of cigarette filters, the slurry preferably is extruded into a cohesive cylindrical rod of the desired diameter. Gas filters having special configurations can be formed by extruding rods having different cross sections. If a particular desired configuration is not obtainable by extrusion, other molding techniques such as pressure molding, injection molding, etc., can be used, as will readily be apparent to those skilled in the art. A further advantage in the use of a fibrous dispersing agent is that much greater porosity can be achieved than could be through the use of a conventional nonfibrous dispersing agent, since the latter would have a tendency to occupy and clog the pores whereas the fibrous agents of the present invention which themselves consist of fibers having a hydrophilic polymer attached on and within the fibers become a part of the fibrous product and maintain the pore structure thereof.

In carrying out the method of the present invention it is important that the wet molded objects formed from the pastes or slurries described above are dried under suitable conditions whereby the pore structure is maintained. If these wet objects are permitted to dry in air or in an oven at atmospheric pressures, the pore structure will collapse and the resultant product will be dense and nonuniform.

The preferred method of drying to produce a product having the desired characteristics is freeze drying, as freezing is the best way to rigidify the internal structure of the shaped object. If the aqueous medium is removed while the article is frozen, shrinkage during drying is minimized, and the dry resultant product retains substantially the same size and internal structure as did the fibrous phase of the wet object. Conventional procedures may be followed in removing the aqueous medium, for example, subjecting the frozen objects to reduced pressure or radiant heat, or preferably simultaneously to both. Freeze drying results in a product having greater whiteness and uniformity than the other methods which might be substituted therefor, for example, solvent drying. The rate of drying is not critical, and does not appear to affect the properties of the final product. However, it is preferred to cause the ice present in the frozen objects to sublime as rapidly as possible without melting. The reduced pressure in the drying chamber permits the application of considerable heat, usually from a radiant heater, without melting the aqueous medium or damaging the objects. In a typical freeze drying operation, the chamber is evacuated to a pressure of about 20 microns of mercury and radiant heat is applied at about 250° F. As heat is applied, the pressure rises and later falls in the chamber as water vapor sublimes from the frozen objects.

While solvent drying has not been found to result in a product having all of the attributes of those produced by freeze drying, it is considered to be an equivalent, less costly method for producing porous articles such as filters where the requirements for whiteness and uniformity of structure are less stringent. In carrying out the solvent drying procedure, the shaped object is treated with an organic solvent, usually by immersion therein. The organic solvent used should be of a relatively volatile nature so that removal thereof from the fibers may be effected without undue difficulty. Examples of solvents which may be used are methanol, ethanol, propanol, acetone, and dioxane; further examples will be readily apparent to those skilled in the art. These organic solvents prevent hydrogen bonding, which occurs in an aqueous slurry, and thereby permit the drying of the wet objects into highly porous products. These solvents cause a swelling of the molded objects, which again contract on evaporation of the solvent to approximately the molded size.

Both of the above described drying procedures have in common the steps of effectively separating the individual fibers preparatory to drying followed by the removal of the liquid constituents of the molded articles while the fibers are so separated, with the result that the dry final product is highly porous. The porous product can easily be cut to further modify the shape thereof, if required.

The process of the present invention is particularly adaptable to the manufacture of cigarette filters. A paste of extrudable consistency can easily be extruded through an orifice having a diameter only slightly larger than that of a cigarette to form a cohesive continuous rod of the desired size. Shrinkage of the rods during drying is generally less than 5%, the product thus being not substantially smaller in diameter than the extruded column. Alternatively the filters, which are easily compressible, may be made slightly oversized and compressed when wrapped to assure a good fit in the wrapper. If the extrusion die is chilled, the freezing step can be initiated during the extrusion step. If the extruded column is passed directly into a chilling medium such as liquid nitrogen, the freezing is nearly instantaneous, and distortion of the rods in further processing minimized. The rod may be dried continuously and cut into suitable lengths for filters when dry, or may be cut into such lengths prior to drying. Also suitable is a batch process wherein the extruded column is first cut into rods of suitable length to fit into a drying chamber, and after drying, the rods are further cut into shorter sections suitable for cigarette filters. Such filters can also be produced by forming the slurry into a sheet, and cutting cylindrical plugs from said sheet before or after drying.

The present method is also readily adaptable to the formation of cigarette filters containing special absorptive ingredients to assist in the selective removal of harmful impurities in tobacco smoke. For example, activated charcoal may be added to the paste prior to extrusion to act as a filtering aid. Other filter assisting additives will suggest themselves to those skilled in the art.

An important advantage of the freeze drying method of the present invention is the ability to control the resistance of the final product to the flow of air therethrough with a high degree of accuracy. With any given polymer, this characteristic can be controlled by several process variables, including the freezing rate, the fiber size, and the percentage of solids in the slurry. As the freezing rate is increased, the pores become finer and more numerous, making it more difficult to draw air through the product. However the density remains the same since the amount of water removed is the same. To illustrate this phenomenon, cylindrical filters based on wood pulp were produced, holding all other process variables constant while varying the rate of freezing. Filters frozen at 10° F. caused a pressure drop of 1.5 inches of water in a stream of air passing therethrough at a rate of 1000 cubic centimeters per minute whereas filters having the same density but frozen more quickly at −10° F. caused a pressure drop of 4.0 inches of water in a stream of air passing therethrough at the same rate. As smaller fiber sizes are used, the resistance to air flow through the product produced becomes greater. Also, as the fiber content of the slurry is increased, the density and air resistance of the product are increased. For producing cigarette filters, a solids content in the slurry of about 10% is preferred, but satisfactory results can be achieved if this percentage is as low as 3%. However, solids contents in the vicinity of 10% are preferable for economic reasons because less water need be removed in the subsequent drying steps. The final dry porous materials of this invention generally have a bulk specific gravity ranging between 0.04 and 1.15 grams per cubic centimeter, and any value within this range can easily be produced by properly selecting the values for the process variables as discussed hereinabove.

The porous articles of the present invention have a high capacity to absorb and retain water or other aqueous media, and therefor are useful for such purposes as dental pads, sanitary napkins, and absorbent pads incorporated in fresh meat packages. While the dried porous products are good water absorbers, it has been discovered that further marked increases in this characteristic can be obtained by compressing the porous dried product. The compressed material appears to possess significant elastic memory when wetted, and therefore balloons out when contacted by water. As shown in Table II infra, this compressed material absorbs significantly more water on a volume basis than the absorbent component of commercially available tampons. It is apparent from these data that the materials of the present invention are unexpectedly good water absorbing agents. A readily observable and distinct difference between the commercially available tampon material and the modified cellulosic materials of the present invention is that the latter retain moisture much better, with noticeably less dripping.

The following examples further illustrate the present invention, which is not limited thereto.

EXAMPLE 1

Two hundred grams of bleached Canadian softwood kraft pulp were added to a vessel containing 73 grams of ferrous sulphate heptahydrate dissolved in 20 liters of water. The slurry was mixed for 15 minutes and damp dried in a hand operated press to 39 percent fiber solids. The damp fibers were then dried at 105° C. for 16 hours. The dry fibers were then reslurried in a steam jacketed ribbon blendor reactor equipped with a reflux condenser with 20 liters of distilled water, continuously mixed, heated to 90° C. in a nitrogen atmosphere, and cooled to 60° C. before adding one liter of inhibitor-free acrylonitrile. One hundred milliliters of 6 percent $H_2O_2$ solution were added as the mixing continued, and the mixture was refluxed moderately for one hour. Three hundred twenty grams of fibers containing 37.5 percent polyacrylonitrile were produced. Two hundred fifty grams of these fibers were added to 4.7 liters of water containing 50 grams of dissolved NaOH and reacted for 2 hours at 90° C. in order to hydrolyze polymerized acrylonitrile to sodium polyacrylate. The resulting paste containing hydrophilic polymer-modified cellulosic fibers was diluted to 2.5 percent solids, neutralized to pH6 with $H_2SO_4$, concentrated to 10 percent solids by screening, and extruded through an 8.34 mm. inside diameter die. The extrudate was cut into 12 centimeters lengths, frozen at −25° C. and dried, while frozen, in a partial vacuum while exposed to radiant heat for approximately 6 hours in a conventional freeze dryer the heater of which was set at 250° F. The product consisted of tan colored self sustaining, porous rods 8 millimeters in diameter having a density of 0.11 gram per cubic centimeter.

EXAMPLE 2

White cigarette filters were produced by eliminating the step of drying the iron-containing fibers, thereby preventing discoloration due to oxidation of a portion of the iron. The blendor reactor of Example 1 was used to slurry 1.5 kilograms of bleached Canadian softwood kraft wood pulp in 15 liters of distilled water containing 1.8 grams of dissolved ferrous ammonium sulphate hexahydrate. The pH of the slurry was adjusted to 3.5 by adding 10 percent $H_2SO_4$. The slurry was heated to 90° C. under nitrogen, cooled to 60° C. before adding 1.9 liters of inhibitor-free acrylonitrile and 37 milliliters of 10 percent $H_2O_2$. The mixture was reacted for one hour at 90° C. to produce 2.45 kilograms of fibers containing 39 percent polyacrylonitrile. One kilogram of this polymer-modified wood pulp was added to 18.8 liters of water containing 200 grams of dissolved NaOH, and reacted at 90° C. for 2 hours. One hundred and fifty grams of the resulting 5 percent solids content paste comprising hydrophilic polymer-modified fibers, were blended with 7.5 grams of bleached western softwood kraft woodpulp in 600 milliliters of water and enough $H_2SO_4$ to adjust the pH to 8.0. The resulting slurry contained 50 percent treated and 50 percent untreated fibers. This slurry was screened to 10 percent solids, extruded and freeze dried as in Example 1 to produce white porous rods having a density of 0.12 grams per cubic centimeter.

EXAMPLE 3

The process of Example 2 was followed in the reaction of 1.5 kilograms of bleached western softwood kraft wood pulp with 3.75 liters of inhibitor-free acrylonitrile. The wood pulp was slurried in 20 liters of water and polymerization was initiated by treating the slurried pulp with 1.8 grams of dissolved ferrous ammonium sulfate hexahydrate, adjusting the pH to 3.9 with 10 percent sulfuric acid and adding the prescribed amount of acrylonitrile simultaneously with 38 milliliters of 10 percent hydrogen peroxide. Fibers containing 58 percent polymerized acrylonitrile were produced by refluxing this mixture for 1 hour. One kilogram of the polymer modified wood pulp was added to 18 liters of water containing 1 kilogram of dissolved sodium hydroxide. While mixing this slurry in the ribbon blendor reactor it was heated to 90° C. and held there for one hour. Six hundred grams of paste containing hydrophilic polymer modified fibers formed in this reaction were mixed for 2 minutes in a one-gallon Waring blendor with 30 grams of bleached aspen sulfite wood pulp and 2 liters of water. The slurry pH was adjusted to 6.0 by adding 10 percent sulfuric acid before filtering the fibrous mixture on a handsheet mold screen. The wet mat containing 13 percent solids was extruded through a 8.34-millimeter diameter, round die. Twelve centimeter sections of the resulting wet rope were frozen and freeze dried to produce white, porous rods that had a density of 0.15 gram per cubic centimeter.

EXAMPLE 4

The process of Example 2 was followed to react 20 pounds of bleached Canadian softwood kraft wood pulp with 58 pounds of inhibitor-free acrylonitrile. The wood pulp was slurried in 75 gallons of water and polymerization was initiated by treating the slurried pulp at pH 3.9 with 23 grams of dissolved ferrous ammonium sulfate hexahydrate, followed by the addition of the prescribed amount of acrylonitrile and 460 milliliters of 10 percent hydrogen peroxide. Fibers containing 67 percent polymerized acrylonitrile were produced by refluxing this mixture for one hour. One kilogram of the polymer-modified wood pulp was added to 18 liters of water containing one kilogram of dissolved sodium hydroxide. While mixing this slurry in a 28-liter ribbon blendor it was heated to 90° C. and held there for one hour. Six hundred grams of paste containing hydrophilic polymer-modified fibers formed in this reaction were mixed for 3 minutes with 30 grams of bleached aspen sulfite pulp and 2 liters of water. The slurry pH was adjusted to 6.0 by adding 10 percent sulfuric acid before filtering the fibrous mixture on a drum filter. The wet mat containing 9 percent solids was extruded through an 8.34-millimeter diameter, round die. Twelve centimeter sections of the extruded wet rope were frozen and freeze dried to produce white, porous rods that had a density of 0.10 gram per cubic centimeter. Cigarettes were prepared for smoking tests by replacing the filters in commercially available cigarettes with weighed and measured sections of the freeze dried rods. The sizes and weights of filters in five other popular brands of cigarettes were also determined before smoking several samples to the same butt length. The moist filters were then removed and weighed to determine amounts of water plus tars absorbed. The moist filters were air dried at room temperature for 16 hours and weighed again to measure tar content. Results of this study, summarized in Table I, show that the filters of this invention absorbed 55 percent more tars than the most efficient commercial cigarette filter tested. The term "tars" as used herein is intended to include all particulate matter, non-volatile at room temperature, that is removed from the smoke.

*Table I*

PERFORMANCE OF CIGARETTE FILTERS IN SMOKING TEST

| Filter | Filter Composition | Filter Properties | | | Weight of Water and Tars Absorbed, mg./cc. of Filter | Weight of Tars Absorbed, mg./cc. of Filter |
| --- | --- | --- | --- | --- | --- | --- |
| | | Length, mm. | Volume, cc. | Weight, g. | | |
| A | Cellulose Acetate | 20 | 1.0 | .187 | 25 | 12 |
| B | Crimped Paper | 25 | 1.25 | .218 | 33 | 16 |
| C | Total Filter (Cellulose Acetate Plus Charcoal). | 16 | 0.8 | .155 | 31 | 16 |
| | Charcoal Portion | 8 | 0.4 | .089 | 24 | 17.5 |
| D | Cellulose Acetate | 20 | 1.0 | .190 | 29 | 17 |
| E | Cellulose Acetate | 17.5 | .9 | .155 | 33 | 19 |
| Filter of Ex. IV | Blend of Wood Pulp and Sodium Polyacrylate-Containing Wood Pulp. | 20 | 1.0 | .112 | 52 | 29.5 |

EXAMPLE 5

A portion of the porous product made in Example 4 was compressed into a flat sheet. This pressed material was compared with commercially available tampons and blotter paper for water absorbency. Each sample was immersed in water, allowed to expand and absorb water to saturation, removed from the water and weighed to measure the increase in weight. The results of this comparison, which demonstrate the remarkable absorbency of the materials of the present invention, are summarized in Table II.

*Table II*

WATER ABSORBENCY OF CELLULOSIC MATERIALS

| Material | Properties of Dry Material | | | Water Absorption | | |
| --- | --- | --- | --- | --- | --- | --- |
| | Weight, grams | Volume, cc. | Density, g./cc. | Amount at Saturation, ml. | Ml./g. Dry Material | Ml./cc. Dry Material |
| Tampon 1 | 1.6 | 3.5 | 0.46 | 24.4 | 15 | 7.0 |
| Tampon 2 | 2.4 | 5.8 | 0.41 | 30.8 | 13 | 5.3 |
| Tampon 3 | 3.0 | 7.0 | 0.43 | 38.1 | 12.5 | 5.5 |
| Blotter Paper | 2.4 | 4.7 | 0.51 | 7 | 1.9 | 1.5 |
| Pressed, Freeze Dried Material of Example IV | 0.33 | 0.45 | 0.73 | 5.0 | 15.2 | 11.1 |

EXAMPLE 6

The process of Example 2 was followed to prepare wood pulp fibers containing 66 percent polyacrylonitrile. One kilogram of the resulting polymer-modified wood pulp was added to 18 liters of water containing one kilogram of dissolved sodium hydroxide. This slurry was mixed and heated to 90° C. and held there for one hour. One hundred eighty grams of the resulting paste of polymer-modified wood pulp fibers containing hydrolyzed polyacrylonitrile was mixed with 6 grams of bleached Canadian softwood kraft wood pulp and 600 milliliters of water. The slurry pH was adjusted to 8.0 by adding 10 percent sulfuric acid before filtering the fibers on a handsheet mold screen. The wet mat containing 15% solids was extruded through a 7.5-millimeter inside diameter, 7-inch long section of copper tubing. Twelve centimeter sections of the extruded wet rope were immersed in methyl alcohol for 5 minutes where they swelled to a diameter to 11 millimeters. Porous dry rods, 8 millimeters in diameter, were made by placing the alcohol soaked ropes on blotting paper and drying them at 40° C. The rods had a density of 0.11 gram per cubic centimeter.

EXAMPLE 7

A 28-liter ribbon blendor reactor was used to slurry 1.5 kilograms of Buckeye type 2N30, nitration grade cotton linters from the Buckeye Cellulose Corp., in 15 liters of distilled water. The slurry was heated to 90° C., flushed with nitrogen gas, and cooled to 60° C. The slurry pH was adjusted to 3.0 by adding 10 percent sulfuric acid before charging a solution of 1.8 grams of ferrous ammonium sulfate hexahydrate in 100 milliliters of water, 1.8 liters of inhibitor free acrylonitrile and 37 milliliters of 10 percent hydrogen peroxide. The nitrogen gas flushing was stopped, and the treated pulp slurry was mixed in the sealed reactor while being heated to 89° C. This condition was maintained for one hour to prepare 2.48 kilograms of fibers containing 39 percent polymerized acrylonitrile. Two hundred fifty grams of the polymer modified wood pulp was added to 4.7 liters of water containing 50 grams of dissolved sodium hydroxide. While mixing this slurry in the ribbon blendor reactor it was heated to 90° C. and held there for 2 hours to hydrolyze some of the polymerized acrylonitrile to sodium polyacrylate. Two and five tenths kilograms of paste from this reaction was diluted to 5 liters with water, treated with 10 percent sulfuric acid to pH 6 and filtered on a 180-mesh screen. The wet mat containing polymer-modified fibers and having 14 percent solids was extruded through an 8.34-millimeter, inside diameter brass tube. Twelve-centimeter sections of extruded wet rope thus formed were chilled at −25° C. until frozen. The frozen rods were freeze dried and resulted in porous filter sections 8 millimeters in diameter, off-white in color, and with a density of 0.15 gram per cubic centimeter. A twenty-millimeter long section of the porous material was substituted for the filter in a commercially available cigarette. Smoking tests established that the freeze dried, cotton linter filter had a tar absorbing efficiency of 30 milligrams per cubic centimeter of filter, as compared to 12–19 milligrams per cubic centimeter of filter in the commercially available cigarette tested.

EXAMPLE 8

Five grams of bleached Canadian softwood kraft wood pulp were soaked in 100 milliliters of 0.2 percent ferrous sulfate for 5 minutes at room temperature. The pulp was filtered from the ferrous sulfate solution, squeezed and dried at 105° C. for 30 minutes. The iron-treated pulp was slurried in a mixture of 50 grams of methacrylic acid and 50 milliliters of distilled water before adding 0.5 milliliter of 30 percent hydrogen peroxide. After mixing, the slurry was placed in a 150-milliliter capacity glass jar, sealed tightly with a screw type cap and incubated for 18 hours at 38° C. The viscous reaction mixture was treated with 25 grams of 45 percent sodium hydroxide to adjust the pH to 6.0 before extruding the paste containing polymer-modified fibers through an 8.34-millimeter, inside diameter brass tube. Ten-centimeter sections of wet rope thereby obtained were chilled at −25° C. until thoroughly frozen and then freeze dried. The white, porous filter sections produced by freeze drying the ropes had a density of 0.5 gram per cubic centimeter.

While particular embodiments of the invention have been described to give a clear understanding of the invention, modifications thereto will be apparent to those skilled in the art. Therefore the invention is intended to be limited only as required by the prior art and the scope of the appended claims.

We claim:
1. A method of forming a porous material based on fibrous cellulose which comprises
   (a) chemically bonding to fibers of natural cellulose a polymer formed therein and thereon by in situ polymerization, said polymer being selected from the group consisting of polyacrylamide, polymethyacrylamide, alkali salts of polyacrylic acid, alkali salts of polymethylacrylic acid, and copolymers thereof,
   (b) forming an aqueous slurry of fibers of natural cellulose fibers including said fibers having polymer chemically bonded therein and thereon, said polymer bonded fibers being present in said slurry in such amount that said polymer constitutes between about 20 percent and 90 percent of the solids weight in said slurry,
   (c) molding an object of desired configuration from said slurry and
   (d) drying the molded object while effectively maintaining the individual fibers in a degree of separation from one another not substantially less than that assumed by said fibers in the wet molded object.

2. A method of forming a porous, shaped object which comprises
   (a) forming in an aqueous suspension a fibrous dispersing medium of gelatinous consistency, said dispersing medium comprising fibers of natural cellulose having chemically bonded therein and thereon by in situ formation a polymer selected from the group consisting of polyacrylamide, polymethacrylamide, alkali salts of polyacrylic acid, alkali salts of polymethacrylic acid, and copolymers thereof,
   (b) forming an aqueous slurry comprising a blend of said fibrous dispersing medium and natural cellulose fibers in such proportion that said polymer constitutes between about 20 percent and 90 percent of the total solids weight of said slurry,
   (c) extruding said slurry through an orifice to form a slender coherent rod,
   (d) freezing said rod, and
   (e) removing the aqueous medium from said rod by sublimation while frozen.

3. The method of claim 1 wherein said cellulosic fibers are wood pulp and said polymer comprises sodium salts of polyacrylic acid formed in said fibers by the in situ polymerization therein of acrylonitrile followed by the hydrolyzation of the resulting polyacrylonitrile with sodium hydroxide.

4. The method of claim 1 wherein said molding comprises extruding said slurry through an orifice to form a slender coherent rod.

5. The method of claim 1 wherein said drying comprises freezing said molded object and removing the aqueous medium therefrom by sublimation.

6. The method of claim 1 wherein said drying comprises displacing the aqueous medium from said wet molded object by means of a volatile organic liquid and evaporating said volatile organic liquid.

7. The method of claim 4 wherein said rods are cut into shorter lengths after said drying.

8. The method of claim 1 wherein said dried object is compressed after drying.

9. The method of claim 2 wherein said dried object is compacted into a dense material.

References Cited by the Examiner

UNITED STATES PATENTS

| | | | |
|---|---|---|---|
| 2,137,404 | 11/1938 | Hollerer | 34—9.5 |
| 2,444,124 | 6/1948 | Wedler | 34—5 |
| 2,517,799 | 8/1950 | McWhorter et al. | 264—109 |
| 2,723,971 | 11/1955 | Cupery | 162—164 |
| 2,806,474 | 9/1957 | Yarsley | 264—109 |
| 3,023,075 | 2/1962 | Larman et al. | 264—168 |
| 3,137,664 | 6/1964 | Shulman et al. | 260—17.4 |
| 3,167,522 | 1/1965 | Shulman | 260—17.4 |
| 3,201,505 | 8/1965 | Meyer | 264—109 |

FOREIGN PATENTS 582,773  9/1959  Canada.

(Other references on following page)

References Cited by the Applicant

UNITED STATES PATENTS

| | | |
|---|---|---|
| 1,827,203 | 10/1931 | Little. |
| 2,739,598 | 3/1956 | Eirich. |
| 2,759,222 | 8/1956 | Bowers. |
| 2,763,267 | 9/1956 | Muller. |
| 2,812,767 | 11/1957 | MacHenry. |
| 3,003,504 | 10/1961 | Tovey et al. |
| 3,104,198 | 9/1963 | Brissette. |
| 3,116,199 | 12/1963 | Cruz et al. |

ROBERT F. WHITE, *Primary Examiner.*

F. S. WHISENHUNT, J. R. HALL, *Assistant Examiners.*